United States Patent
Suzuki et al.

[11] Patent Number: 6,167,209
[45] Date of Patent: Dec. 26, 2000

[54] COPYING SYSTEM HAVING PLURAL COPYING MACHINES

[75] Inventors: Chikatsu Suzuki; Utami Soma; Susumu Kurihara; Atsushi Takahashi, all of Hachioji, Japan

[73] Assignee: Konica Corporation, Tokyo, Japan

[21] Appl. No.: 09/223,433

[22] Filed: Dec. 30, 1998

[30] Foreign Application Priority Data

Jan. 14, 1998 [JP] Japan .................................. 10-005427

[51] Int. Cl.[7] .................................................. G03G 15/00
[52] U.S. Cl. .................................. 399/8; 399/82; 399/85
[58] Field of Search ............................... 399/9, 8, 83, 82, 399/85

[56] References Cited

U.S. PATENT DOCUMENTS

| | | | |
|---|---|---|---|
| 5,564,109 | 10/1996 | Snyder et al. | 395/828 |
| 5,669,040 | 9/1997 | Hisatake | 399/83 |
| 5,689,755 | 11/1997 | Ataka | 399/8 |
| 5,790,119 | 8/1998 | Sklut et al. | 399/82 X |
| 5,809,363 | 9/1998 | Kitamura et al. | 399/8 |
| 5,907,669 | 5/1999 | Yoshiura et al. | 399/8 X |
| 5,915,148 | 6/1999 | Hamaguchi et al. | 399/8 X |
| 5,930,552 | 7/1999 | Ikeda | 399/8 |

*Primary Examiner*—William J. Royer
*Attorney, Agent, or Firm*—Frishauf, Holtz, Goodman, Langer & Chick, P.C.

[57] ABSTRACT

A copying system includes a plurality of copying apparatuses, a communication line interconnecting the plurality of copying apparatuses with each other such that the plurality of copying apparatuses can communicate image data therebetween, and a controller. The controller controls the copying system such that: (i) several or all of the plurality of copying apparatuses produce copying materials in parallel according to image data read by one of the plurality of copying apparatuses, and (ii) at least one of the several or all of the plurality of copying apparatuses receive image data of a next job while a present job is being conducted.

9 Claims, 6 Drawing Sheets

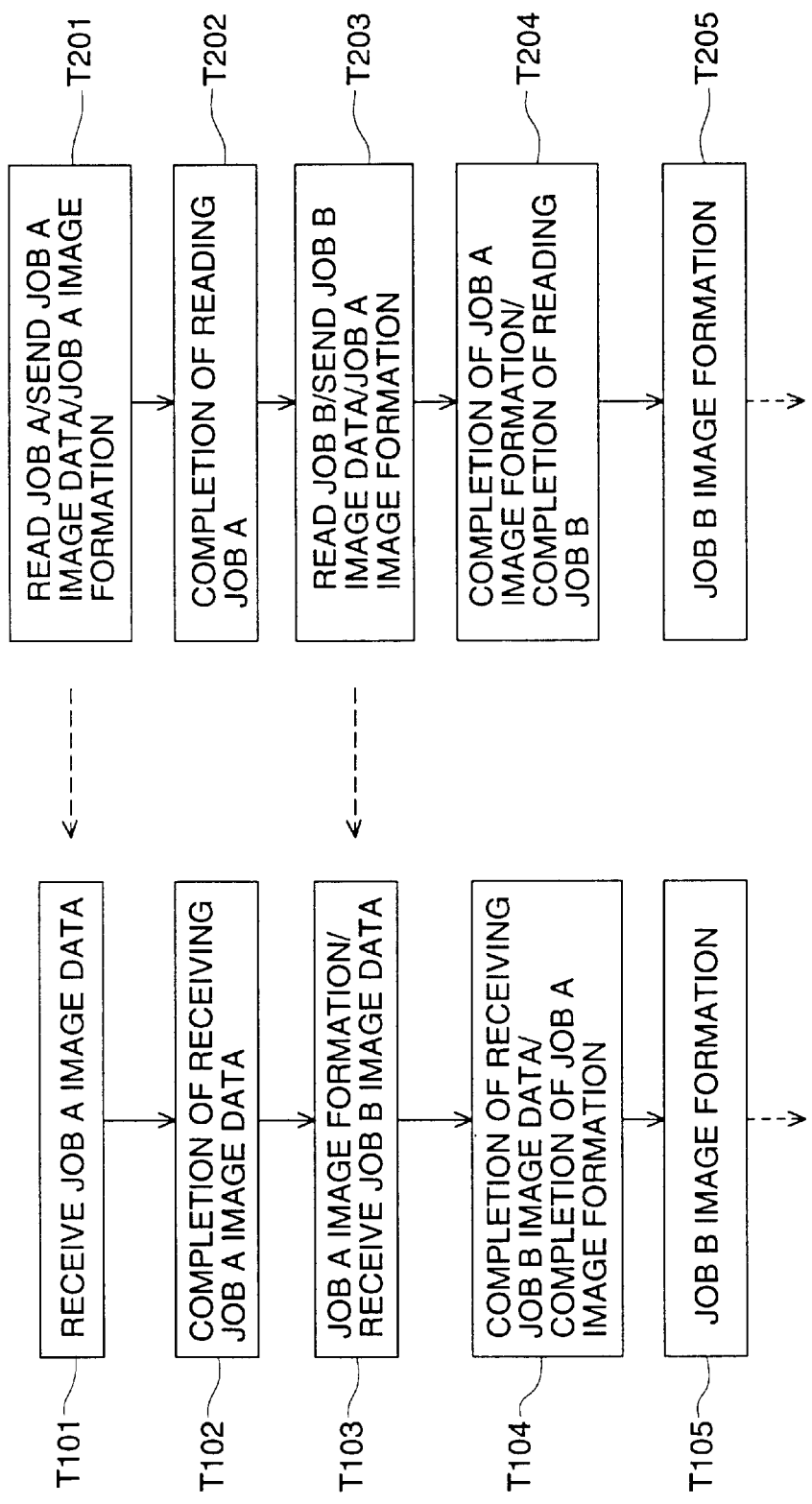

COPYING SYSTEM HAVING PLURAL COPYING MACHINES

BACKGROUND OF THE INVENTION

The present invention relates to a copying system, and specifically to a copying system in which copying materials are parallelly produced according to common image data by a plurality of copying machines which are interconnected by a communication means.

The following is commonly conducted: a plurality of copying machines are interconnected by a communication means, copying materials based on common image data are parallelly produced, and a large volume of copying materials are efficiently produced. In such case, one of the plurality of copying machines is set as a main machine and the others are set as sub-machines, and image data read in the main machine is supplied to sub-machines by the communication means, and the image data is made common to all machines. Every time the production of the copying materials of one job has been completed, image data of the next job is read, thus a plurality of jobs are successively conducted.

In the copying system described above, the image data of the next job can not be read while the present job is not completed, therefore, there is a problem that efficiency is not good when a plurality of jobs are successively conducted.

SUMMARY OF THE INVENTION

The present invention is accomplished to solve the above problem, and the object of the present invention is to realize a copying system which is greatly efficient when a plurality of jobs are continuously conducted.

In order to attain the object, a copying system of the present invention has a structure in which copying materials according to common image data are produced parallelly by a plurality of copying machines which are interconnected by a communication means, wherein the plurality of copying machines can receive the image data of the next job while the present job is conducted.

BRIEF DESCRIPTION OF THE DRAWINGS

FIGS. 6(a) and 6(b) are state transition views each showing operations of the copying system of an example of the present invention.

DETAILED DESCRIPTION OF THE PREFERRED EMBODIMENT

Referring to FIGS. 1 to 4, an example of the present invention will be detailed below. However, the present invention is not limited to the example.

Figure 1:
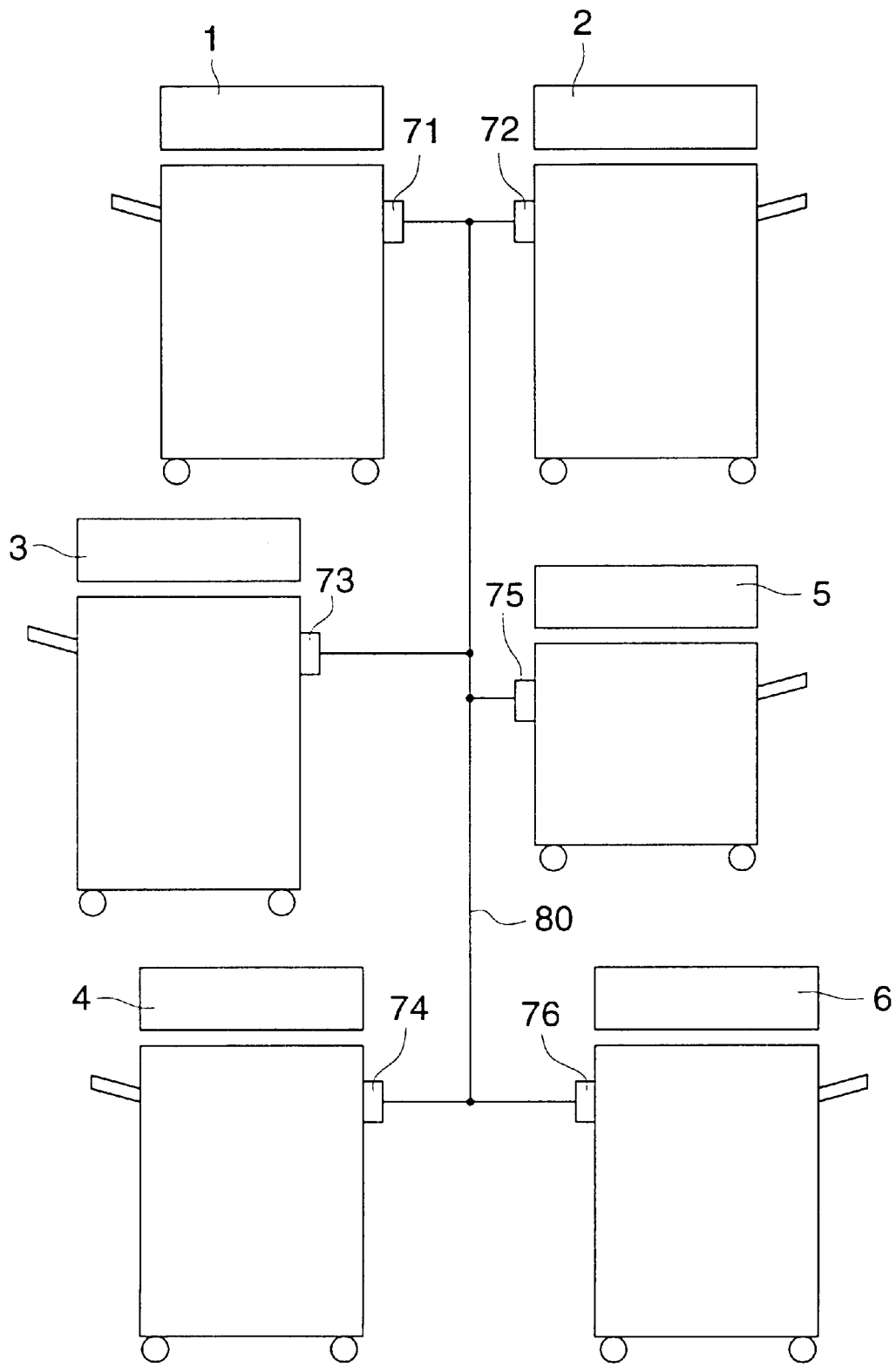
FIG. 1 is a connection diagram of a copying system of an example of the present invention.

FIG. 1 is a connection diagram showing a copying system in which a plurality of copying machines (herein, 6 copying machines) are interconnected. Copying machines 1 to 6 which can be individually operated, are respectively connected to a communication line 80 through each of connectors 71 to 76, send and/or receive image data or state information as needed, and as for operations, as described later, can be operated like as a single copying machine as a whole.

Figure 2:
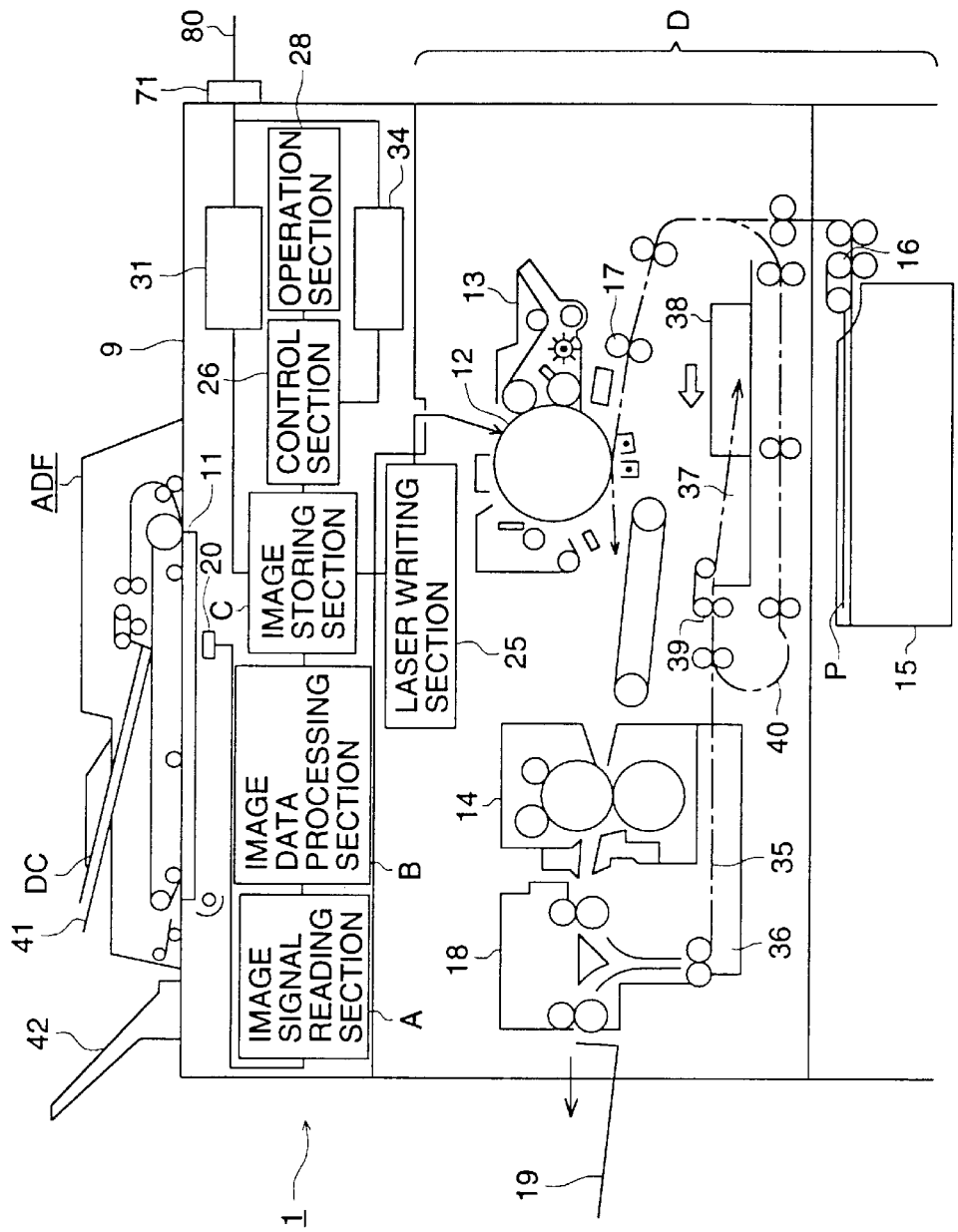
FIG. 2 is a general structural view of a digital copying machine in an example of the present invention.

FIG. 2 is a general structural view showing a structure of a digital copying machine as an example of a copying machine which can include a copying system of the example of the present invention. In FIG. 2, a copying machine 1 comprises a copying machine main body 9 which reads image data of a document DC, stores the image data, forms an image on a recording sheet according to the image data, and an automatic document feeder ADF which automatically sends successively a document DC onto a platen glass of a platen. Copying machines 2 to 6 also have the same structure as described above. Details of the structure of the copying machine 1 will be described below, however, the copying machines 2 to 6 are the same as the copying machine 1.

The automatic document feeder ADF driven by a motor, not shown, is operated as follows: when a plurality of document DC sheets are piled and set on a document set tray 41, the advancing direction of each page of the document is reversed by a reversing section and is automatically conveyed sequentially to a predetermined position on the platen glass 11, and simultaneously, the document which has been read is removed from the surface of the platen glass 11, and delivered onto a document delivery tray 42.

The document is illuminated by an appropriate illumination lamp, and a document image is formed on an image pick-up element 20 by a combination of a scanning optical frame including a plurality of mirrors, not shown, and a lens. The image pick-up element 20 comprises of a CCD line sensor and outputs an image signal in the lateral (primary scanning) direction of the document by a reading-out clock pulse of the CCD. Further, by the movement of the scanning optical frame, scanning in the longitudinal (subsidiary scanning) direction of the document is conducted, and an image signal for one document page is outputted.

As described above, the image signal read out in an image signal reading section A, that is, the image data, is subjected to various kinds of image processing such as density conversion, magnification processing, or gradation correction in an image data processing section B, and then, stored in an image storing section C, and outputted to an image forming section D.

The image forming section D has a laser writing section 25, and forms an image on the recording sheet using an electrophotographic technique. That is, in the image forming section D, the image data modulates the intensity of an laser beam generated by a semiconductor laser, not shown, according to the image signal. The laser beam is deflected for scanning in an exposure scanning system, not shown, and the laser beam scans the surface of a photoreceptor drum 12, thereby forming an electrostatic latent image. The electrostatic latent image is developed to a toner image by a developing section 13, the toner image is transferred onto a recording sheet, and fixed by a fixing unit 14, and thereby, a transfer image of the document, that is, a copying material is obtained.

The recording sheet P is stored in a cassette 15, taken out by a sheet feed roller with a belt 16, and sent to the photoreceptor drum 12 by a register roller 17, and an image is formed thereon as described above.

In the case of a one-sided copy mode in which an image is formed on a single side of the recording sheet, a reversed delivery sheet switching section 18 is switched to the delivery sheet side, and the recording sheet on a single side of which an image is formed, is delivered onto a delivery tray 19.

In the case of a two-sided copy mode in which an image is formed on both sides of the recording sheet, the recording sheet on a single side of which an image is formed, is guided to a reverse-conveyance section 36 by the reversed delivery sheet switching section 18 which is switched to the reverse-conveyance section 36, along a path 35 as shown by a one-dotted chain line in the drawing, and stacked on an intermediate tray 37, and forms an intermediate stack 38.

When the image formation on one side of the recording sheet has been completed, the intermediate stack 38 is moved to the left as shown by a white arrow in the drawing, and the recording sheet is taken out by a sheet feed roller with a belt 39, and is sent to a two-sided recording sheet conveying section having a U-shaped guide 40. Herein, the obverse and reverse sides of the recording sheet are reversed, and the recording sheet is sent and brought into contact with the register roller, which is not rotated now, and blocked.

When the relationship between the reverse side image formed on the photoreceptor drum 12 and the recording sheet becomes optimum, feeding of the recording sheet P by the register roller 17 is started, the second image formation is conducted, and the recording sheet P is delivered onto the delivery tray 19 through the reversed delivery sheet switching section 18 which has been switched to the delivery sheet side.

An operation section 28 is connected to the control section 26, and can designate operation conditions such as a selection of an operation mode as a single copying machine, a designation input of a recording sheet size and the number of sheets to be copied, and a selection of an interconnection copying mode in which a plurality of copying machines are interconnected and operated, by using an operation panel and key switch, which will be described later, by the operator.

Further, the control section 26 conducts the following: the control of the electrophotographic process for the image formation and the recording sheet feeding control as a normal copying machine, and further, the control in each stage in the case of copying in the interconnection mode (interconnection copying), that is, the control of transmitting/receiving of image data by an image data transmitting/receiving section 31 or transmitting/receiving of the state information by a state information transmitting/receiving section 34, and state discrimination of an external copying machine according to the state information.

Figure 3:
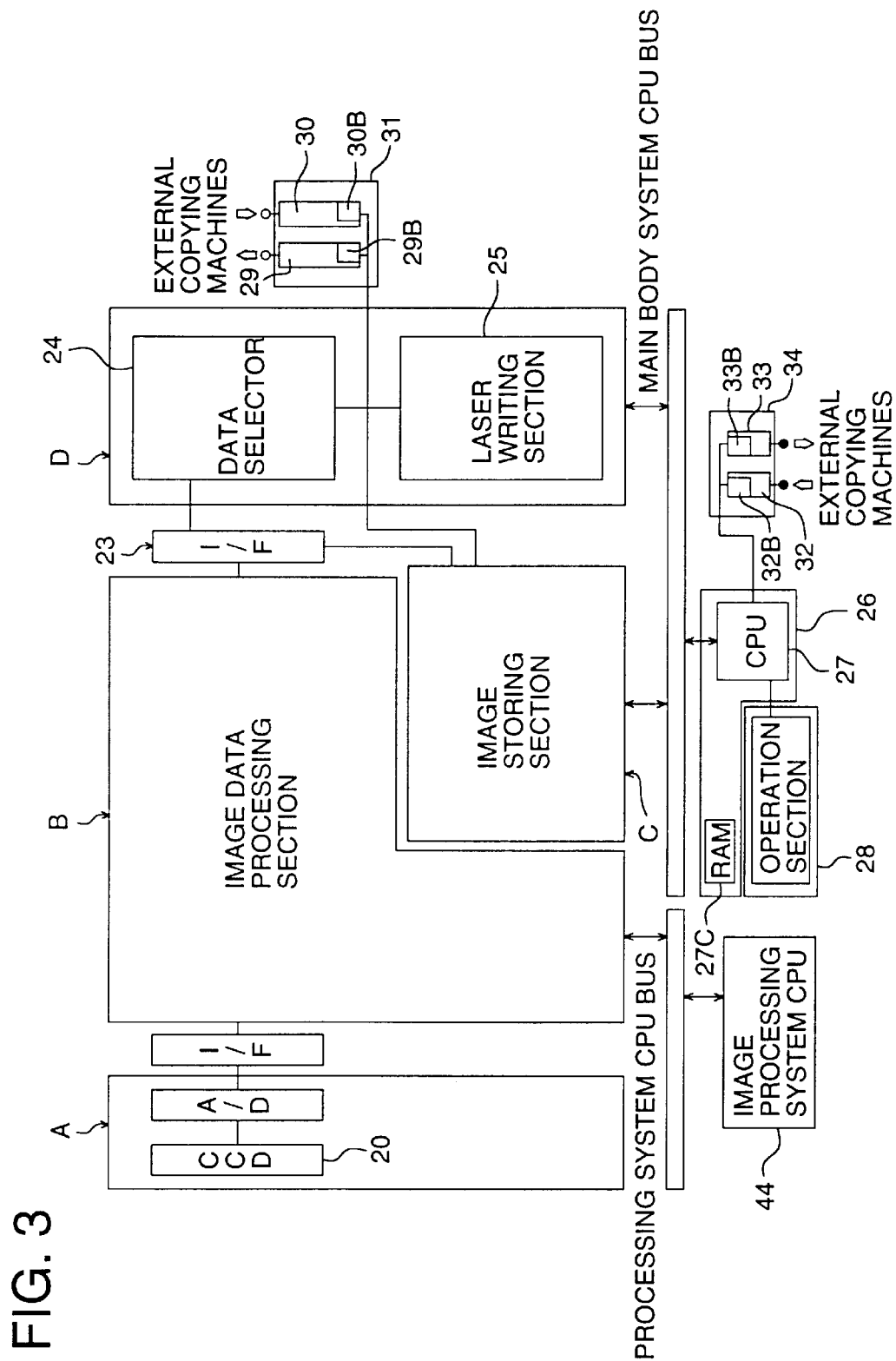
FIG. 3 is a block diagram showing an electrical structure of the digital copying machine of an example of the present invention.

FIG. 3 is a block diagram showing an electrical structure of the digital copying machine. According to the block diagram in FIG. 3, an electrical structure of the digital copying machine including an image signal reading section A, an image data processing section B, an image storing section C, an image forming section D, the control section 26, image data transmitting/receiving section 31, and state information transmitting/receiving section 34, will be described below.

Initially, in the image signal reading section A, an analog image signal outputted from the image pick-up element 20 is converted into a digital image signal, that is, image data by the A/D converter, and is outputted to the image data processing section B through an interface I/F.

The digital image signal inputted to the image data processing section B is converted into density information in the density conversion section, not shown. Further, the density information is subjected to magnification processing such as enlarging or reduction, and gradation correction processing corresponding to the characteristic of the image forming section D, as needed, and then, is outputted to the image storing section C and the image forming section D through an interface 23.

The image storing section C has an address register, a data buffer, an image data writing/reading means, not shown, including a latch circuit to hold the reading/writing signal, and a memory, not shown, to store compressed image data for each page. In order to accumulate more image data in a limited memory capacity, a data compression/expansion unit to compress the image data to be written into the memory, and to expand the image data read out of the memory, is provided as needed.

The image storing section C stores and holds the inputted image data for a plurality of pages. The image forming section D can correspond to both of a mode in which the image is instantly formed on the recording sheet corresponding to reading-out of the document, and a mode in which the image data stored for each page in the image storing section C is read out later in an arbitrary order, and the image is formed.

In order to realize at least these two modes described above, a data selector 24 to switch the image data from the image storing section C and the ordinary image data for the instant image formation, and a laser writing section 25 are provided. The data selector 24 selects either one of the image data read out of the image storing section C, or the image data successively outputted from the image data processing section B corresponding to the reading, and outputs it to the image writing section 25. The data selector 24 may be provided in the image data processing section B as needed. Further, the image forming section D can correspond to both of a mode in which the image is formed according to the image data of the present copying machine, and a mode in which the image is formed according to the image data sent from another copying machine.

For the image processing section B, an image processing system CPU 44 is provided. The control section 26 for the image storing section C and the image forming section D has a CPU 27. The operation section 28 is connected to the CPU 27. The control section 26 has a RAM 27C to temporarily store operation data, and designates the operation mode as the copying machine or controls the copying condition, according to the designation input from the operation section 28.

The control section 26 sets the operation conditions such as a selection of a mode as a single copying machine, the designation input of the size of the recording sheet and the number of copying sheets, and a selection of an interconnected copying mode in which a plurality of copying machines are interconnected and operated, according to the designation input from the operation section 28 using an operation panel and a key switch.

The control section 26 advances the control of the next process while monitoring whether the operation of the copying machine is normal or not, or grasps states of the copying machine using various sensors so as to conduct the self diagnosis to grasp its exact states at the occurrence of trouble. These states are read in the CPU 27 as the interruption at each predetermined time, or are read in a temporary memory such as the register or buffer as data or flags, when the state is changed.

These condition data are read in the CPU 27 or the memory as individual or combination data, and then, displayed on the operation panel as a state of, for example, heater warm-up completion or copying machine available (ready), by an LED or lamp. When there are many flags, these are stored in a flag table or flag data area provided in the RAM 27C, and a portion of these data or flag type information is transmitted to the outside as state information in the copying machine at the time of interconnection copying.

The image data transmitting/receiving section 31 includes an image data transmitting unit 29, image data transmitting buffer 29B, image data receiving unit 30, image data receiving buffer 30B, and an interface unit, not shown, and transmits image data read from the memory to an external copying machine, or receives image data from an external copying machine.

The state information transmitting/receiving section 34 includes a state information receiving unit 32, state information receiving buffer 32B, state information transmitting unit 33, state information transmitting buffer 33B and an interface board, not shown, and transmits the state information for the image formation to an external copying machine, or receives the information from an external copying machine.

The control of the image data transmitting/receiving section 31 is conducted by a program for communication control. The CPU 27 designates a transmitting address of the image data, and may only transfer the image data stored in the image storing section C to the image data transmitting buffer 29B in the image data transmitting unit 29 and send a transmission start signal, and the communication sequence of connection start, connection confirmation, transmission, and connection end, is automatically advanced, and image data can be transmitted to the image data receiving buffer 30B of the image data receiving unit 30 of another copying machine.

In the same manner, the control of the state information transmitting/receiving section 34 is also conducted by a program for communication control. The CPU 27 may only transfer the state information stored in the flag data area to the state information transmitting buffer 33B of the state information transmitting unit 33 and send the transmission start signal, and the communication sequence of connection start, connection confirmation, transmission, and connection end, is automatically advanced, and the state information can be transmitted to the state information receiving buffer 32B of the state information receiving unit 32 of another copying machine.

Figure 4:
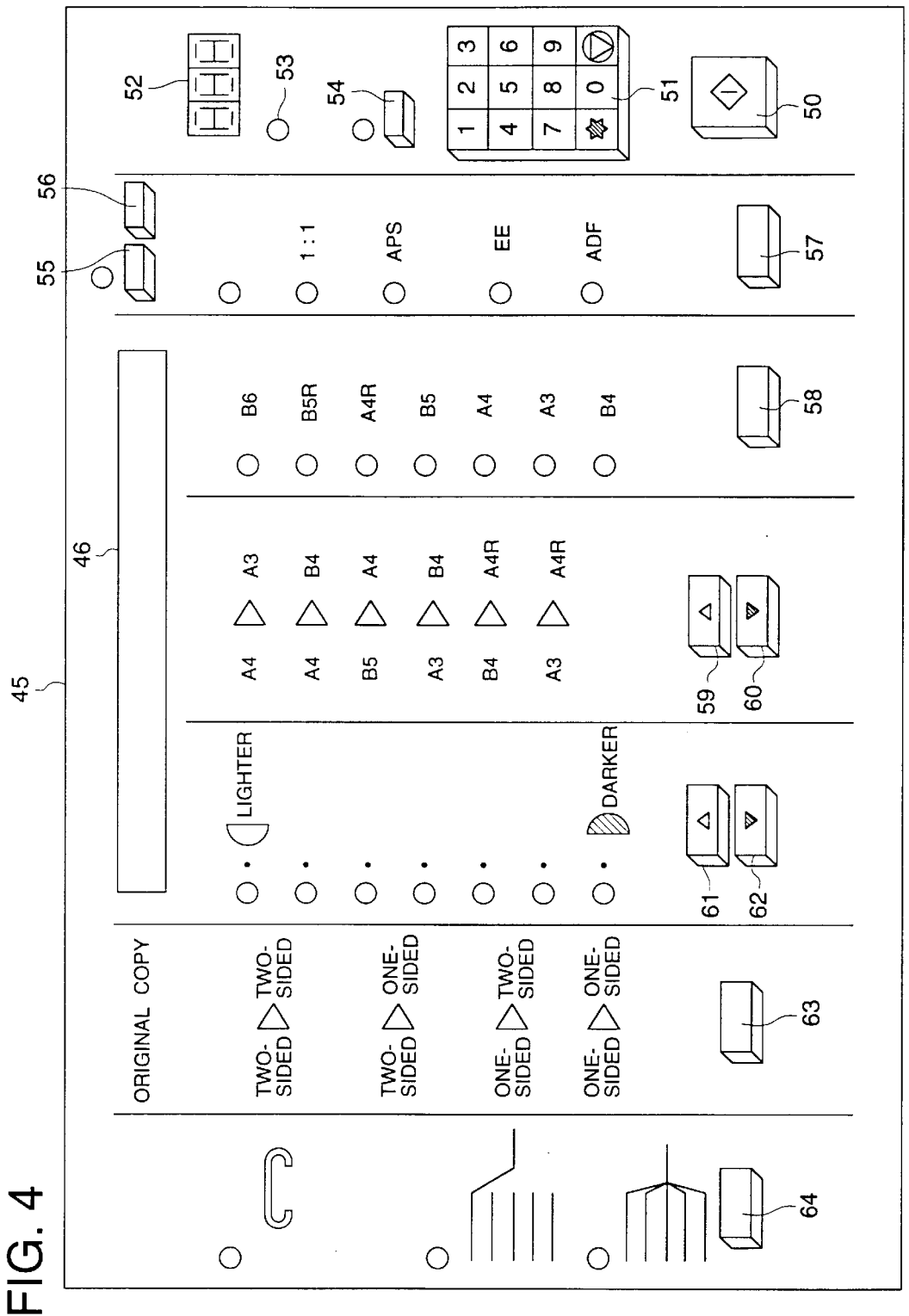
FIG. 4 is a plane view of an operation panel of the digital copying machine of an example of the present invention.

FIG. 4 is an illustration showing an operation panel 45 of the operation section 28. When a copy button 50 is pressed, the copying operation are started. Numeral keys 51 is used for inputting the number of copy volumes, and the number of copy volumes set by the keys and the number of copy volumes in the copying operation are displayed on a display section 52. An interruption button 54 is used for interrupting the continuous copy operation to urgently copy 1 to 2 sheets during the continuous copy operation.

In the present description, a mode in which a plurality of copying machines are interconnected and operated, is referred to as an interconnection mode. For selection of the interconnection mode, by pressing an interconnection mode selection button 55, the interconnection mode is designated and selected, and an LED provided above the button is activated, and displays "under operation in the interconnection mode".

When an interconnection release button 56 is pressed, the interconnection mode is released, and the LED for under interconnection mode selection is inactivated. In this connection, under interconnection mode selection, necessary displays such as designations, messages for inquiries, or input designations for recovery copying, are displayed on a liquid crystal display panel 46 composed of dot matrix.

In normal functions as a copying machine, conditions can be manually designated by pressing a predetermined button such as a sheet size designation button 58, a magnification enlargement button 59, a magnification reduction button 60, a copy density (lighter) button 61, a copy density (darker) button 62, a copy mode (one-sided to two-sided) selection button 63, and a sorter mode selection button 64, or the like.

The copy mode selection button 63 designates a copy mode such as one-sided to one-sided mode in which the one side of the document is read and an image is formed on the one side of the recording sheet, or two-sided to two-sided mode in which the two sides of the document are read and images are formed on the two sides of the recording sheet. When the copy mode selection button 63 is designated, writing of the image data in the memory, change or no-change of the reading sequence of the image data stored in the memory, automatic switching of the reverse delivery sheet switching section, or use or no-use of the intermediate tray, are automatically set.

Figure 5A:
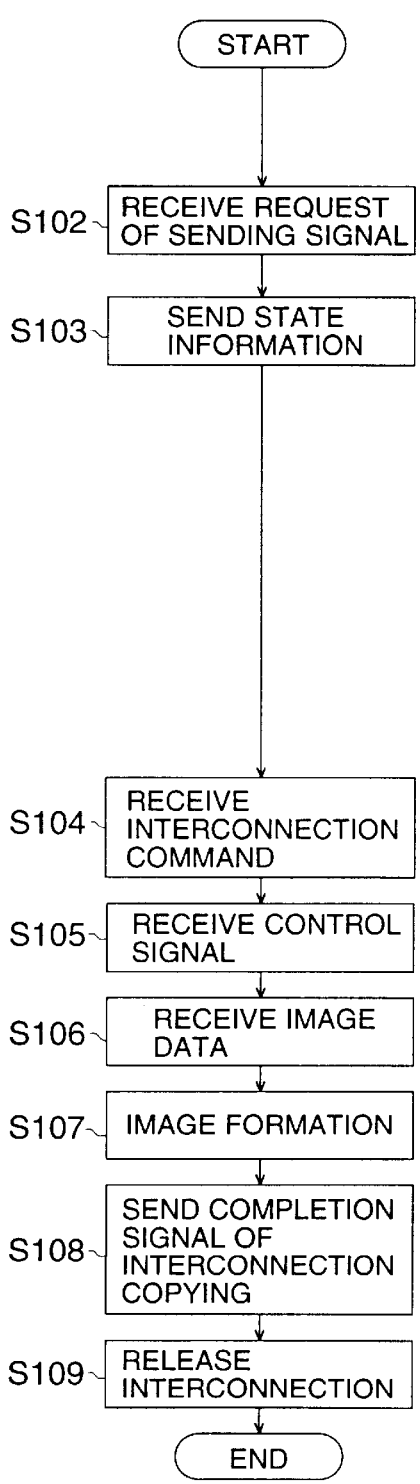
FIGS. 5(a) and 5(b) are flow charts each showing operations of the copying system of an example of the present invention.
Figure 5B:
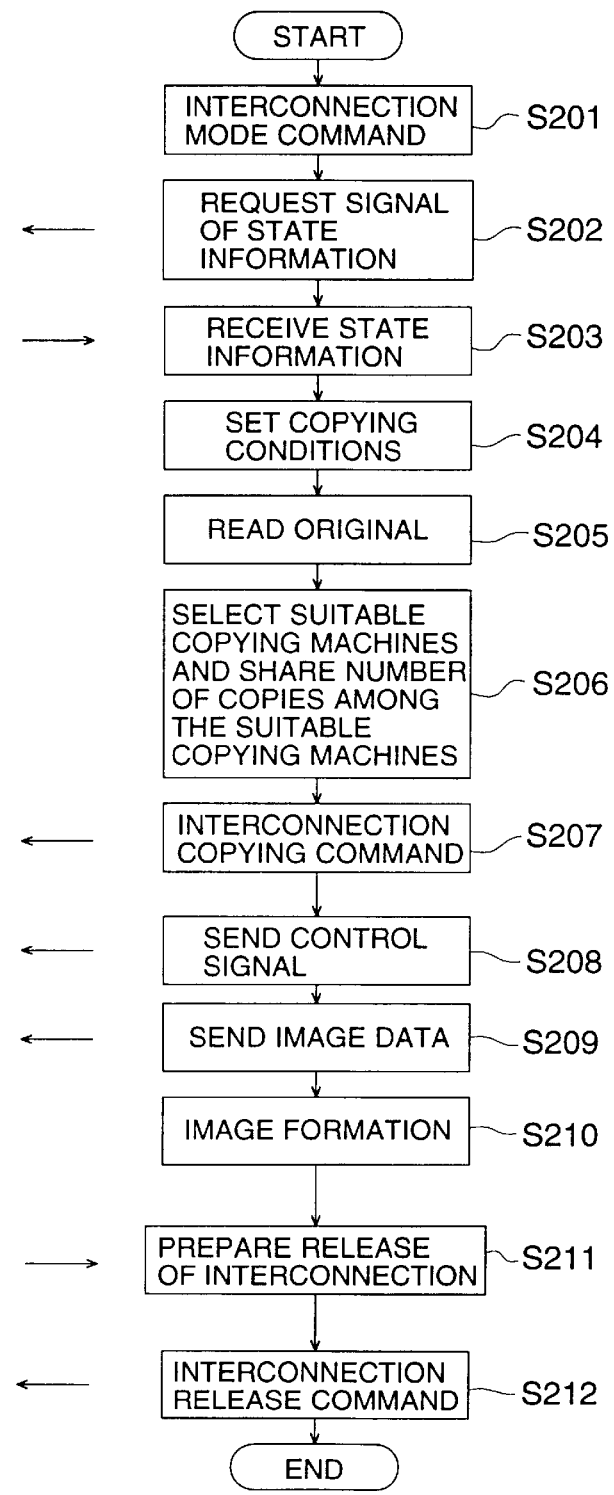

FIGS. 5(a) and 5(b) are flow charts of a main routine of the main copying machine and sub-copying machine which enter the interconnection operation. FIG. 5(b) shows operations of the main copying machine from step S201 to step S212, and FIG. 5(a) shows operations of the sub-copying machine from step S101 to step S109.

When the large number of copy volumes are copied in the interconnection mode, an interconnection mode command to copy in the interconnection mode is outputted (step S201) by pressing an interconnection mode selection button 55 on the operation panel 45 of the main copying machine (for example, the copying machine 1), and following to that, a state information transmission request is transmitted to the other copying machines (for example, copying machines 2 to 6) which are connected to a communication line 80 (step S202). Each copying machine which receives the state information transmission request (step S102), transmits the state information having the content described later, to the main copying machine (step S103). The main copying machine receives these state information (step S203).

Copying conditions are set by using the numeral keys 51 or operation buttons on the operation panel 45 of the main copying machine (step S204). Then, document reading is started by pressing the copy button 50 (step S205), and the image data obtained by reading the document is stored in the image storing section C.

Next, the main copying machine discriminates a copying machine appropriate for interconnection copying according to the state information received from the sub-copying machine, and calculates the share of the number of copy volumes for it in the interconnection copying (step S206). When there is no copying machine appropriate for the interconnection copying, it is displayed, therefore, the interconnection copying mode can be released by pressing an interconnection mode release key 56.

Next, the main copying machine transmits the interconnection copying command to the sub-copying machine (step S207), and transmits a control signal for copying (step S208). After the sub-copying machine receives the interconnection copying command (step S104), it conducts the control for operations in the interconnection copying mode, not in the single copying mode, (for example, under operation in the interconnection mode, is displayed on the display section), and receives the control signal for copying (step S105).

Next, the main copying machine transmits the image data stored in the image storing section C (step S209), and conducts image formation of the copy amount shared to the present machine itself (step S210). Each sub-copying machine receives the image data (step S106), and stores it in each image storing section C, then, reads out each shared copy amount from the image data stored in its image storing section C according to the received control signal, and conducts image formation (step S107). When copying of the shared copy amount of the sub-copying machine has been completed, the sub-copying machine transmits the completion signal of interconnection copying (step S108).

The main copying machine receives the completion signal of interconnection copying successively sent from the sub-copying machines, and after it has received the final completion signal of interconnection copying, that is, after received the completion signals of interconnection copying from all sub-copying machines, it enters preparation of release of interconnection copying (step S211), and sends the interconnection release command (step S212). Corresponding to the command, each sub-copying machine enters the interconnection release operation (step S109), and displays the release of interconnection mode. After that, the main copying machine and each sub-copying machine are respectively enter operations in the single mode.

The image data transmission to the sub-copying machine and image formation by the main copying machine are conducted in parallel with the document reading operation. Further, after the completion of document reading of the present job, the main copying machine can receive a reservation of the next job, that is, it can conduct the document reading and setting of copying conditions of the next job, even during image formation of the present job. The read-out image data of the next job and set copying conditions are stored in the memory.

The sub-copying machine can store the image data of the next job transmitted from the main copying machine in the memory, in parallel with the image formation of the present job, and when the image formation of the present job has been completed, it can start the image formation of the next job.

By using such the function of the main copying machine and sub-copying machine, a plurality of jobs in the interconnection mode are continuously carried out. Transition views of operation conditions of the main copying machine and sub-copying machine when a plurality of jobs are continually carried out in the interconnection mode, are shown in FIGS. 6(a) and 6(b). FIG. 6(b) shows the transition view of the operation conditions of the main copying machine in status T201 to T205, and FIG. 6(a) shows the transition view of the operation conditions of the sub-copying machine in status T101 to T105.

As shown in FIGS. 6(a) and 6(b), the main copying machine reads the document of job A, and stores its image data in the memory thereof, and transmits it to the sub-copying machine, and in parallel with that, conducts image formation of the job A according to the read-in image data (status T201). The sub-copying machine receives the image data of the job A, and stores it in the memory (status T101).

The main copying machine can receive the job B, which is the next job, when document reading of the job A has been completed, (status T202), and starts document reading of the job B according to a command of the operator, stores the image data in the memory and transmits it to the sub-copying machine (status T203). During that time, the main copying machine parallelly processes image formation of the job A.

When the sub-copying machine has received the image data of the job A ( status T102), the sub-copying machine starts image formation of the job A, and receives the image data of the job B, and stores it in the memory (status T103).

The main copying machine starts image formation of the job B (status T205) when the image formation of the job A has been completed and document reading of the job B has been completed, (status T204). The sub-copying machine starts image formation of the job B (status T105) when the image data of the job B has been received and image formation of the job A has been completed (status T104).

As described above, the document of the job B is parallelly read in the main copying machine while the job A is conducted therein, and the same image data is supplied also to the sub-copying machine by communication, therefore, the image formation of the job B is started when the image formation of the job A has been completed, thereby, a plurality of jobs in the interconnection mode can be efficiently conducted, without producing useless blank time. FIGS. 6(a) and 6(b) show an example in which two jobs are continuously processed, however, it is needless to say that more than three jobs can also be continuously processed in the same manner as described above.

An example in which transmission of the image data of the next job from the main copying machine to the sub-copying machine is carried out in parallel with execution of the present job by the present machine, is described above. However, the transmission may also be carried out after the present job has been completed. This is preferable from a point of view that the control sequence is simplified. In contrast to that, it is preferable that the transmission is carried out in parallel with the execution of the present job by the present machine as described above, from a point of view that a plurality of jobs can be more efficiently processed.

When the interconnection mode release button 56 is pressed on the sub-copying machine side during job processing in the interconnection mode as described above, the interconnection mode of the sub-copying machine is released, and the sub-copying machine can be transferred to a single mode. Hereby, the sub-copying machine is separated from the interconnection, and can receive and process an independent job. Incidentally, in the case where the interconnection mode release request from the sub-copying machine is detected, when the main copying machine separates the sub-copying machine from the interconnection, the main copying machine conducts redistribution of the unprocessed number of copy volumes among the present machine and other sub-copying machines under the inter-connecting mode. The main copying machine incorporates the copying machine which is operated in the single mode, into the interconnection mode as needed, when it is available for use, according to its state information. As described above, the interconnection mode and the single mode can be freely switched as needed, thereby, the system flexibility can be enhanced and the facilities in use are increased.

As detailed above, according to the present invention, a plurality of copying machines receive the image data of the next job during execution of the present job, and carry out the next job in succession to the present job, thereby, when a plurality of jobs are successively carried out, an efficient copying system can be realized.

Further, according to the present invention, one of the plural copying machines transmits the image data of the received next job to other copying machines during execution of the present job, so that the image data of the next job is common to all the copying machines, thereby, when a plurality of jobs are successively carried out, an efficient copying system can be realized.

Still further, according to the present invention, one of the plural copying machines transmits the image data of the received next job during the execution of the present job to other copying machines after the present job has been carried out, so that the image data of the next job is common to all the copying machines, thereby, when a plurality of jobs are successively carried out, an efficient copying system can be realized and further control procedure can be simplified.

Yet further, according to the present invention, a plurality of copying machines receive individual image data and respectively produce the copying material by mode switching, thereby, an excellent copying system having high system flexibility can be realized.

Furthermore, according to the present invention, a plurality of copying machines receive common image data and produce common copying materials parallelly, by mode switching, thereby, an excellent copying system having high system flexibility can be realized.

What is claimed is:

1. A copying system comprising:
   (a) a plurality of copying apparatuses;
   (b) communication means for interconnecting the plurality of copying apparatuses with each other such that the plurality of copying apparatuses can communicate image data therebetween; and
   (c) a controller which controls the copying system such that: (i) several or all of the plurality of copying apparatuses produce copying materials in parallel according to image data read by one of the plurality of copying apparatuses, and (ii) at least one of the several or all of the plurality of copying apparatuses receive image data of a next job while a present job is being conducted.

2. The copying system of claim 1, wherein the controller controls a given one of the plurality of copying apparatuses that has received the image data of the next job to send the image data of the next job to at least one other one of the plurality of copying apparatuses while the present job is being conducted.

3. The copying system of claim 1, wherein the controller controls a given one of the plurality of copying apparatuses that has received the image data of the next job to send the image data of the next job to at least one other one of the plurality of copying apparatuses after the present job is conducted.

4. The copying system of claim 1, wherein the controller controls the plurality of copying apparatuses to switch between an interconnection mode in which more than one of the plurality of copying apparatuses produce the copying materials in parallel according to image data of the present job, and a single mode in which the plurality of copying apparatuses receive individual image data and produce respective individual copying materials.

5. A copying apparatus comprising:
   (a) image reading means for reading an image and generating image data;
   (b) image forming means for producing copying materials;
   (c) communication means for interconnecting with another copying apparatus; and
   (d) a controller for: (i) controlling the communication means and the image forming means so as to produce copying materials in parallel with the other copying apparatus according to image data read by the image reading means and image data received from the other copying apparatus through the communication means, and (ii) controlling the communication means so as to receive image data of a next job while a present job is being conducted.

6. The copying apparatus of claim 5, wherein the controller controls the communications means to send the image data of the next job to the other copying apparatus while the present job is being conducted.

7. The copying apparatus of claim 5, wherein the controller controls an operation mode to switch between an interconnection mode in which the copying materials are produced in parallel with the other copying apparatus based on image data of the present job, and a single mode in which individual image data different from the image data of the present job is accepted and copying materials are produced by the image forming means on the basis of the individual image data.

8. The copying apparatus of claim 7, further comprising:
   detecting means for detecting a switch of the operation mode of the other copying apparatus from the interconnection mode to the single mode,
   wherein in the case that the detecting means detects the switch of the operation mode of the other copying apparatus from the interconnection mode to the single mode after sending image data to the other copying apparatus, the controller conducts redistribution of unprocessed copy volumes with the other copying apparatus under the interconnection mode.

9. The copying apparatus of claim 8, further comprising:
   detecting means for detecting a switch of the operation mode of the other copying apparatus from the interconnection mode to the single mode,
   wherein in the case that the detecting means detects the switch of the operation mode of the other copying apparatus from the single mode to the interconnection mode, the controller conducts redistribution of unprocessed copy volumes with the other copying apparatus under the interconnection mode.

* * * * *